United States Patent
Chamberlin

(10) Patent No.: US 11,290,774 B2
(45) Date of Patent: *Mar. 29, 2022

(54) SYSTEMS AND METHODS FOR ADAPTIVELY BUFFERING MEDIA CONTENT AT A DIGITAL VIDEO RECORDER

(71) Applicant: ROVI GUIDES, INC., San Jose, CA (US)

(72) Inventor: David Wayne Chamberlin, Pacifica, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/909,336

(22) Filed: Jun. 23, 2020

(65) Prior Publication Data

US 2020/0322676 A1     Oct. 8, 2020

Related U.S. Application Data

(63) Continuation of application No. 15/857,462, filed on Dec. 28, 2017, now Pat. No. 10,735,804.

(51) Int. Cl.
*H04N 21/44*     (2011.01)
*G06F 16/78*     (2019.01)
(Continued)

(52) U.S. Cl.
CPC ....... *H04N 21/44004* (2013.01); *G06F 16/78* (2019.01); *H04N 21/2401* (2013.01);
(Continued)

(58) Field of Classification Search
CPC ......... H04N 21/44004; H04N 21/4384; H04N 21/4622; H04N 16/78; H04N 21/2401; H04N 21/44213; H04N 21/47202; H04N 21/4331; H04N 21/2183; H04N 21/251; H04N 21/25891; H04N 21/6125; H04N 21/64322; H04L 67/2842; G06F 16/78
See application file for complete search history.

(56) References Cited

U.S. PATENT DOCUMENTS 6,239,794 B1    5/2001    Yuen et al.
6,564,378 B1    5/2003    Satterfield et al.
(Continued)

FOREIGN PATENT DOCUMENTS

WO     2007119096 A1     10/2007

OTHER PUBLICATIONS

PCT International Search Report for International Application No. PCT/US2018/040001, dated Sep. 12, 2018 (15 pages).

*Primary Examiner* — Dramos Kalapodas
(74) *Attorney, Agent, or Firm* — Haley Guiliano LLP

(57) ABSTRACT

Systems and methods are disclosed herein for adaptively buffering content of a media asset from a media source when a different media asset from a different media source is being played at user equipment. The media guidance application may predict when and which channel or other media source the user is likely to switch to and then buffer content from the predicted channel or other media source accordingly. The pre-tuning buffering may enhance the user experience by reduce tuning latency when the user switches channels.

18 Claims, 8 Drawing Sheets

(51) Int. Cl.
*H04N 21/442* (2011.01)
*H04N 21/438* (2011.01)
*H04N 21/462* (2011.01)
*H04N 21/24* (2011.01)

(52) U.S. Cl.
CPC ... *H04N 21/4384* (2013.01); *H04N 21/44213* (2013.01); *H04N 21/4622* (2013.01)

(56) References Cited

U.S. PATENT DOCUMENTS

| | | | |
|---|---|---|---|
| 7,165,098 | B1 | 1/2007 | Boyer et al. |
| 7,761,892 | B2 | 7/2010 | Ellis et al. |
| 7,985,134 | B2 | 7/2011 | Ellis |
| 8,046,801 | B2 | 10/2011 | Ellis et al. |
| 8,219,134 | B2 * | 7/2012 | Maharajh ............... H04L 65/602 |
| | | | 455/519 |
| 9,264,508 | B2 | 2/2016 | Wolf et al. |
| 10,091,549 | B1 * | 10/2018 | Dalbec ............... G06Q 30/0631 |
| 10,225,365 | B1 * | 3/2019 | Hotchkies ........... H04L 67/2842 |
| 10,277,669 | B1 * | 4/2019 | Joliveau ............. H04L 65/4084 |
| 10,311,371 | B1 * | 6/2019 | Hotchkies ................ G06N 5/02 |
| 10,440,367 | B1 | 10/2019 | Choi et al. |
| 2002/0174430 | A1 | 11/2002 | Ellis et al. |
| 2005/0251827 | A1 | 11/2005 | Ellis et al. |
| 2005/0262257 | A1 | 11/2005 | Major et al. |
| 2007/0136742 | A1 | 6/2007 | Sparrell |
| 2007/0136751 | A1 | 6/2007 | Garbow et al. |
| 2010/0017815 | A1 * | 1/2010 | Mas ................... H04N 21/2662 |
| | | | 725/14 |
| 2010/0153885 | A1 | 6/2010 | Kates |
| 2010/0251310 | A1 * | 9/2010 | Hirota ................ H04N 21/4312 |
| | | | 725/59 |
| 2011/0282745 | A1 * | 11/2011 | Meoded ................. H04H 60/33 |
| | | | 705/14.61 |
| 2012/0235895 | A1 | 9/2012 | Kambe |
| 2013/0046849 | A1 * | 2/2013 | Wolf .................. H04N 21/4384 |
| | | | 709/217 |
| 2013/0174045 | A1 | 7/2013 | Sarukkai et al. |
| 2014/0026052 | A1 | 1/2014 | Thorwirth et al. |
| 2015/0208120 | A1 * | 7/2015 | Yao ................... H04N 21/6543 |
| | | | 725/9 |
| 2015/0281756 | A1 | 10/2015 | Soon-Shiong et al. |
| 2015/0350714 | A1 | 12/2015 | Normile et al. |
| 2016/0274744 | A1 * | 9/2016 | Neumann ........ H04N 21/47202 |
| 2017/0094332 | A1 * | 3/2017 | Thomas ........... H04N 21/25891 |
| 2017/0103553 | A1 | 4/2017 | Busayarat et al. |
| 2017/0259115 | A1 * | 9/2017 | Hall ......................... G06F 19/00 |
| 2017/0331914 | A1 * | 11/2017 | Loach ............... H04N 21/25833 |
| 2017/0346865 | A1 * | 11/2017 | Hartman ............... H04L 65/602 |
| 2017/0353744 | A1 | 12/2017 | Kunisetty et al. |
| 2018/0129273 | A1 | 5/2018 | Thorwirth et al. |
| 2020/0336770 | A1 | 10/2020 | Tsukagoshi |
| 2021/0185391 | A1 | 6/2021 | Chamberlin |

* cited by examiner

SYSTEMS AND METHODS FOR ADAPTIVELY BUFFERING MEDIA CONTENT AT A DIGITAL VIDEO RECORDER

CROSS-REFERENCE TO RELATED APPLICATIONS

This application is a continuation of U.S. patent application Ser. No. 15/857,462, filed Dec. 28, 2017. The disclosure of which is hereby incorporated by reference herein in its entirety.

BACKGROUND

Existing media systems conventionally provide a set-top box that receives television signals via a tuner. When a channel is switched, e.g., using a remote control, the set-top box tunes to the user selected channel and starts to receive video content streaming from the user selected channel. However, as the video content received from the channel that is newly switched to needs to be buffered before the content can be displayed on a television (e.g., to decode the compressed digital content to an uncompressed format for high-definition videos, to overlay closed captioning, etc.), the user usually experiences a delay when tuning to a different channel. Some existing systems may implement pre-tuning caching of the channel next to the channel that is being played such that when the user moves the channel "up" or "down," content from the next channel can be played from the cache with a reduced delay. However, in different scenarios, when the user switches to a different channel that is not adjacent to the channel currently being played (e.g., tuning from a standard-definition local channel to a high-definition channel), or when the user switches the currently played channel to playback a high-definition movie that is previously stored in a digital video recorder (DVR), existing system is usually unprepared for the newly switched video content. The user may experience non-negligible delays during the switch, which could yield an unsatisfactory user viewing experience.

SUMMARY

Accordingly, systems and methods are disclosed herein for adaptively or predictively buffering content of a media asset from a media source when a different media asset from a different media source is being accessed at user equipment. The media guidance application may predict when and which channel or other media source the user is likely to switch to and then buffer content from the predicted channel or other media source accordingly. The pre-tuning buffering may enhance the user experience by reducing tuning latency when the user switches channels.

The media guidance application may determine that a first media asset from a first media source is being played (or accessed) at user equipment. The media guidance application may then retrieve metadata corresponding to the first media asset and user behavioral data from a user profile. For example, the media guidance application may obtain user behavioral data from the user profile, including but not limited to user preference data, user viewing history, and/or the like.

The media guidance application may determine a first future progression point when the first media source is predicted to be switched at the user equipment based at least in part on the retrieved metadata and the user behavioral data. In some embodiments, the media guidance application may determine whether the first media asset is a scheduled media asset transmitted in real time from the first media source, e.g., a television channel. In response to determining that the first media asset is a scheduled media asset transmitted in real time from the first media source, the media guidance application may search, within the metadata corresponding to the first media asset, for a plurality of data segments representing a plurality of commercial breaks from the first media asset. The media guidance application may then search, within the plurality of data segments, for a subset of data segments representing a subset of commercial breaks having a start time point later than the current progression point, and determine, within the subset of commercial breaks, a commercial break having an earliest start time based on the subset of data segments. The media guidance application may then determine the start time corresponding to the next commercial break as the future progression point when the user is likely to switch to a different media source.

In some embodiments, the media guidance application may periodically generate a set of frames from the first media asset for a duration when the first media asset is played. For each frame from the plurality of frames, the media guidance application may perform content recognition to determine whether the respective frame corresponds to a commercial break. The media guidance application may then aggregate a commercial break pattern including the interval duration when the first media asset is played. The media guidance application may then predict a next progression point later than the current progression point, at which a next commercial break will occur based on the commercial break pattern.

In some embodiments, the media guidance application may identify, based on the metadata of the first media asset being displayed, that the first media asset corresponds to a sporting event. Based on the type of the sporting event, the media guidance application may retrieve a set of competition rules corresponding to the sporting event. The media guidance application may progressively sample a frame from the first media asset and perform content recognition on the sampled frame to extract an indicator corresponding to the current competition score, e.g., based on a display layout format of the sporting event. The media guidance application may then determine an estimate of remaining time before a competition outcome of the sporting event is available based on the current competition score and the set of competition rules.

In some embodiments, the media guidance application may transmit, to a remote server, a first query for a first number of users within a geographical area that are viewing the first media asset from the first media source at a first progression point. The media guidance application may transmit, to the remote server, a second query for a second number of users within the geographical area that are viewing the first media asset from the first media source at a second progression point. The media guidance application may determine whether the second number is less than the first number for more than a pre-defined percentage threshold. In response to determining that the second number is less than the first number for more than the pre-defined percentage threshold, the media guidance application may predict that the user is likely to switch from the currently displayed media asset shortly, and may start to buffer a second media asset from the second media source into the storage device.

The media guidance application may determine the second media source that the first media source is predicted to be switched to at the determined first future progression point. For example, in some embodiments, the media guidance application may first determine a set of media assets from a plurality of media sources. Each media asset from the set of media assets is available at the time corresponding to the determined first future progression point when the user is likely to switch from the first media asset. For each media asset from the set of media assets, the media guidance application may determine a respective user interest score for a respective media asset available from the respective media source at the time corresponding to the determined first future progression point. For example, the media guidance application may compare metadata corresponding to the respective media asset with a user interest profile.

In some embodiments, the media guidance application may determine a respective popularity score for the respective media asset available from the respective media source at the time corresponding to the determined first future progression point. For example, the media guidance application may aggregate user sentiment data, such as but not limited to user comments, user "likes," user scheduled recordings, etc., corresponding to the respective media asset obtained from a data source.

In some embodiments, the media guidance application may determine a continuity score for the respective media asset available from the respective media source at the time corresponding to the determined first future progression point based on a user viewing pattern relating to the respective media asset. For example, the media guidance application may determine that a respective media asset has been played but not completed playing within a first pre-defined past period of time based on user behavioral data. The media guidance application may assign a first (relatively high) continuity score. For another example, the media guidance application may determine that a plurality of media assets belonging to the same series with the respective media asset have been played during a second pre-defined past period of time based on user behavioral data. The media guidance application may assign a second continuity score to the respective media asset. The first continuity score can be defined as higher than the second continuity score.

In some embodiments, the media guidance application may compute a priority score for the respective media asset based on a weighted sum of the respective user interest score, the respective popularity score and the respective continuity score. The media guidance application may rank the set of media assets based on the respective priority score, and then select the media asset having the highest priority score as the predicted media asset that the user is likely to switch to.

The media guidance application may then monitor a current progression point indicative of a viewing status corresponding to the first media asset. The media guidance application may determine whether the current progression point is within a pre-defined range of the determined first future progression point, e.g., two minutes, three minutes, and/or the like. In response to determining that the current progression point is within the pre-defined range of the determined first future progression point, the media guidance application may start to buffer the second media asset from the second media source into a storage device before the second media asset is displayed or presented.

In some embodiments, the media guidance application may determine a type of the second media source. In response to determining that the second media source is a television channel that has the second media asset scheduled for transmission at the time corresponding to the first progression point, the media guidance application may cache streaming data from the television channel in the cache unit at the storage device for a period of caching time. The media guidance application may arrange, during the period of caching time, a new storage space in the hard disk at the storage device for storing the streaming data. The media guidance application may then transfer the cached streaming data from the cache unit to the arranged storage space at the hard disk after the period of caching time.

In some embodiments, in response to determining that the second media source is a local or network hard disk that has the second media asset previously stored, the media guidance application may determine a recent progression point within the second media asset that has been most recently accessed. The media guidance application may transfer, from the local or network hard disk, a segment of the second media asset starting from the recent progression point, to the cache unit at the storage device.

In response to receiving an indication to switch from the first media source to the second media source, the media guidance application may play back a buffered portion of the second media asset. In some embodiments, after starting to play back the buffered portion of the second media asset from the cache unit, the media guidance application may start to buffer the first media asset from the first media source, in case the user may switch back to the first media source after a commercial break. The media guidance application may determine whether a second indication is received to switch back to the first media source from the second media source within a duration derived from the commercial break pattern, e.g., the average length of the commercial break, etc. In response to receiving the second indication to switch back to the first media source from the second media source within the duration derived from the commercial break pattern, the media guidance application may play back a buffered portion of the first media asset from the cache. If no second indication is received to switch back to the first media source from the second media source within the duration derived from the commercial break pattern, the media guidance application may stop caching the first media asset and delete the buffered portion of the first media asset from the cache unit.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
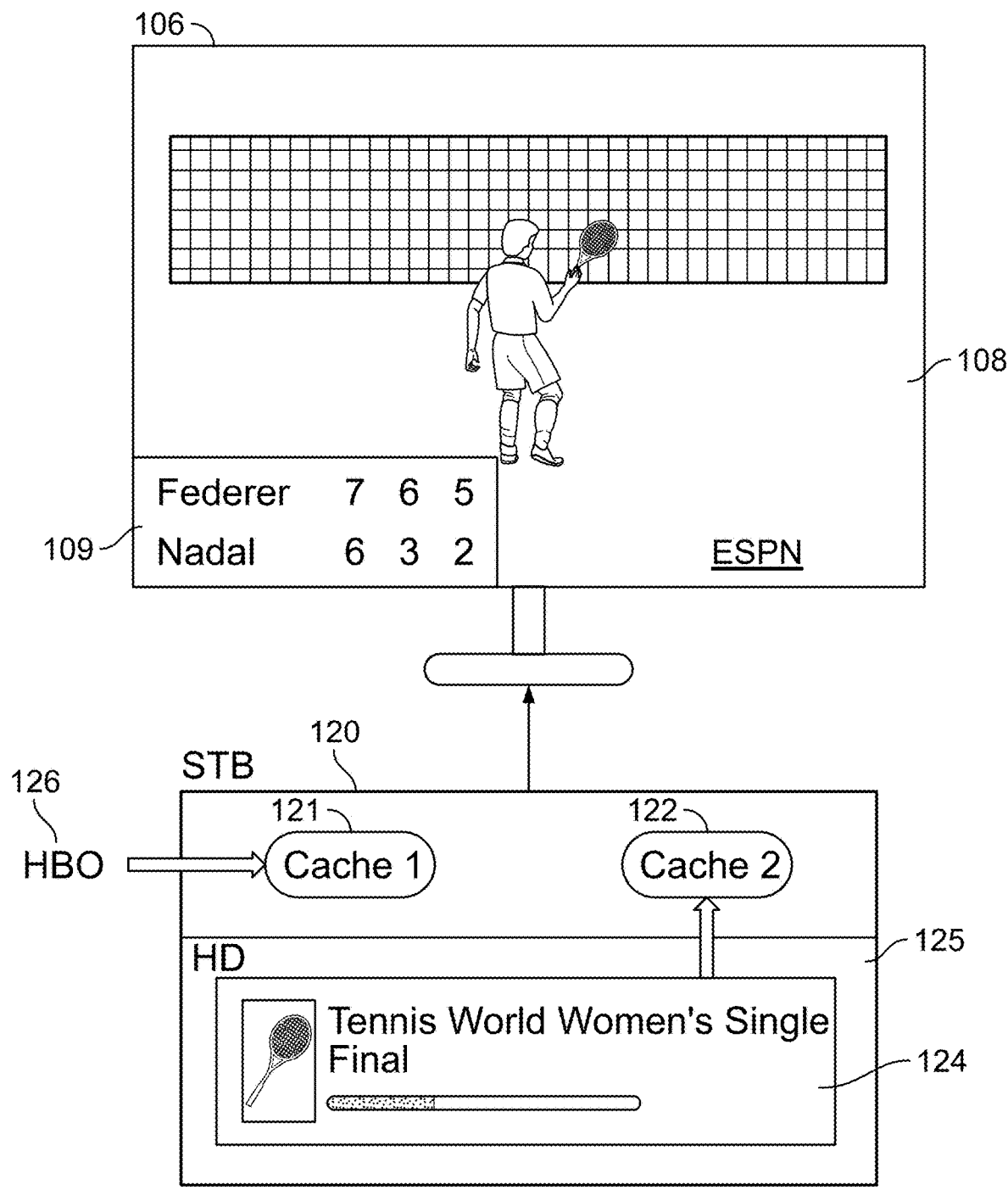
FIG. 1 depicts an illustrative example diagram 100 for adaptively buffering video content from a media source in response to predicting a switching event to the media source is likely to occur, in accordance with some embodiments of the disclosure.

Systems and methods are disclosed herein for adaptively buffering content of a media asset from a media source when a different media asset from a different media source is being played at user equipment. Specifically, a media guidance application, implemented at user equipment, may be used to determine when or under what condition the media guidance application would start buffering content from a different channel or DVR. The media guidance application may predict when the user is likely to switch channel to a different media asset. For example, the media guidance application may determine that the progression point of a media asset the user is watching is getting close to a commercial break, at which the user is likely to switch to a different media asset. For another example, the media guidance application may determine, based on the current score of a sporting event, that the outcome of the sporting event is definitive and the user is likely to switch to a different media asset, even when the scheduled time duration for the sporting event has not finished yet. For another example, the media guidance application may receive data from a remote server, indicating that a large number of other users have switched from the channel at which the user is watching. After predicting when the user is likely to switch from the current media asset the user is watching, the media guidance application may determine another media source that the user is likely to switch to, and start buffering media content from the other media source.

In some embodiments, the media guidance application, upon predicting that the user is likely to switch to a different media asset at a future time point, may determine a different media source to buffer video content from. For example, the media guidance application may choose to buffer video content from a "tune-up" or "tune-down" channel from the television channel that the user is watching. For another example, the media guidance application may choose a user's interested channel based on user preference, a popular channel based on the time of the day, a popular channel based on the popularity and/or relevance of the media asset that is being played (e.g., a popular sporting event is going on, etc.), and/or the like.

In some embodiments, the media guidance application may choose to buffer video content from a non-linear media source, such as but not limited to previously stored media assets stored at the local mass storage within the set-top box, video-on-demand (VOD), an Internet video channel (e.g., a YouTube channel, etc.), and/or the like. In some embodiments, VOD may be provided from a remote server. In some embodiments, VOD may be provided by a third-party server, such as but not limited to Netflix®, Amazon®, YouTube®, Hulu®, and/or the like. Upon predicting a future time when the user is likely to switch to a different media asset, and predicting which media source and/or media asset the user is likely to switch to, the media guidance application may automatically start buffering video content from the new media source or the particular media asset in a cache unit, before the user switches away from the currently played media asset. If the user does not switch away from the currently played media asset at the predicted future time, or the user switches to a media source that is different from the predicted media source, the media guidance application may vacate the buffered content from the cache unit immediately.

As referred to herein, the term "media source" refers to any data source that provides a media asset that can be transmitted and displayed on user equipment. For example, a media source may include, but not limited to, a television network channel, an Internet television channel, an online streaming channel, a local storage system storing media assets, a network storage system storing media assets, a VOD system, and/or the like.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative example diagram 100 for adaptively buffering video content from a media source in response to predicting a switching event to the media source is likely to occur, in accordance with some embodiments of the disclosure. Diagram 100 shows user equipment 106 displaying a media asset 108. For example, the media asset 108 may relate to a live sporting event (e.g., a tennis match) that is transmitted from a sports channel (e.g., the ESPN channel). A set-top box 120 may receive, via a tuner, media data corresponding to the media asset 108 from the sports channel and in turn causes the display of the media asset 108 on user equipment 106. The set-top box 120 may include one or more cache units 121-122, and a local mass storage device 125 used to store media assets (e.g., the recorded match "Women's Single Final" 124) recorded from different media sources. In some embodiments, the mass storage device 125 may be housed within user equipment, e.g., similar to storage 408 in FIG. 4. In some embodiments, the mass storage device 125 may correspond to a network storage device, e.g., similar to data source 516 accessible via communications network 514 in FIG. 5.

When the media asset 108 is being played, the media guidance application may predict a time point when the user is likely to switch from the media asset 108, and starts buffering video content from a media source that the user is likely to switch to. Specifically, the media guidance application may adaptively buffer content of a media asset from a media source when a different media asset from a different media source is being played at user equipment. In that case, the media guidance application may buffer video content of the media asset at the cache unit 121 or 122, such that the video content may be decoded, decompressed, overlaid with closed captioning data, and/or the like, and ready to be output to the user equipment 106 for display. In this way, when the user switches to a different program, as the different program has been buffered at the cache units 121 or 122, the media guidance application may display the buffered portion of the program, which has been ready for display, directly from the cache nit 121 or 122, with little or reduced or insignificant buffering latency.

The media guidance application may identify that a first media asset from a first media source is being played at user equipment. For example, the user may be watching a tennis match from the ESPN channel, e.g., shown at the currently played media asset 108. The media guidance application may then retrieve metadata corresponding to the first media asset and user behavioral data from a user profile. For example, the media guidance application may retrieve metadata including the program title, closed captioning data, a program description, information relating to the event such as the event schedule (e.g., the schedule of the tennis event, etc.), and/or the like. For another example, the media guidance application may obtain user behavioral data from the user profile, including but not limited to user preference data (e.g., frequently watched programs or channels, user bookmarked channels or media assets, categories that user frequently watched, etc.), user viewing history (e.g., user viewing pattern, unfinished VOD media assets or previously stored media assets, and/or the like), and/or the like.

The media guidance application may then predict a time point when the user is likely to switch to a different media asset or media source, e.g., based on the user's viewing pattern, etc. Specifically, the media guidance application may determine a first future progression point when the first media source is predicted to be switched at the user equipment based at least in part on the retrieved metadata and the user behavioral data.

In some embodiments, the media guidance application may predict that the user may switch to a different channel at the next commercial break of the currently displayed channel. Specifically, the media guidance application may determine whether the first media asset is a scheduled media asset transmitted in real time from the first media source. For example, the media guidance application may determine a type of the first media asset, e.g., whether the tennis match 108 is a live program streaming from a linear media source (e.g., a television channel, an Internet video channel, etc.), or a non-linear program (e.g., a VOD program, a previously stored media asset, etc.). In response to determining that the first media asset is a scheduled media asset transmitted in real time from the first media source, the media guidance application may search, within the metadata corresponding to the first media asset, for a plurality of data segments representing a plurality of commercial breaks from the first media asset. For example, the metadata of the linear program streaming from a television channel may include data tags indicating a start point and an end point of each commercial break. The media guidance application may then retrieve the start time of the next commercial break from the data tags. Specifically, the media guidance application may search, within the plurality of data segments, for a subset of data segments representing a subset of commercial breaks having a start time point later than the current progression point, and determine, within the subset of commercial breaks, a commercial break having the earliest start time based on the subset of data segments. The media guidance application may then determine the start time corresponding to the next commercial break as the future progression point when the user is likely to switch to a different media source.

In some embodiments, the media guidance application may monitor the content of the media asset and progressively determine whether the current playback position corresponds to a commercial break based on what is displayed on screen. Specifically, the media guidance application may periodically generate a set of frames from the first media asset for a duration when the first media asset is played. For each frame from the plurality frames, the media guidance application may perform content recognition to determine whether the respective frame corresponds to a commercial break. For example, the media guidance application may extract logos, images, and/or texts from the respective frame, based on which the media guidance application may search within a database of advertised item logos, names, images, and/or the like to identify whether there is a match. In response to identifying the current video frame or the current closed caption generated at the current playback position relates to an advertisement, the media guidance application determines that the user is likely to switch to a different media source at or shortly after the current playback position. For another example, based on identified past commercial breaks, the media guidance application may then aggregate a commercial break pattern, e.g., how often and how long a commercial break is interleaved within the currently displayed media asset 108. For example, the media guidance application may determine that a commercial break is played every ten minutes during the playback of the first media asset when a series of commercial breaks have exhibited the pattern to appear every ten minutes. The media guidance application may then predict a next progression point later than the current progression point, at which a next commercial break will occur based on the commercial break pattern. In some embodiments, the media guidance application may retrieve user behavioral data, e.g., from storage 408 in FIG. 4 or data source 518 via communications network 514 in FIG. 5, which indicates a user behavioral pattern on whether the user switches away from a channel during a commercial break. For example, the media guidance application may calculate a percentage of occurrence when the user switches away from the program at commercial breaks, and determine whether the percentage of occurrence is higher than a pre-determined threshold (e.g., 66%, 70%, etc.). The media guidance application may prepare to buffer content from a different channel when the percentage is higher than the pre-determined threshold.

In some embodiments, the media guidance application may predict the channel switching time when the competition result of a currently displayed sporting event 108 is finalized or close to be finalized such that the user may no longer keep watching the same sporting event. Specifically, the media guidance application may identify, based on the metadata of the first media asset being displayed, that the first media asset corresponds to a sporting event, e.g., a tennis match (as shown at 108), a basketball match, a football match, etc.

Based on the type of the sporting event, the media guidance application may retrieve a set of competition rules corresponding to the sporting event. For example, the competition rules may include logic rules to determine which participant of the sporting event is prevailing based on a competition score of the currently displayed sporting event. In some examples, the competition rules may apply to the competition scenarios of a single sporting match, e.g., which participant wins the sporting match. In some examples, the competition rules may include logics that apply to a series of sporting events to determine the competition status relating to a participant in the currently displayed sporting event. For example, in the qualifying round of World Cup series, the overall goal difference sometimes governs whether a team is qualified in their respective league. Thus, the competition result, e.g., whether a team is qualified and will enter the next round, can be determined once the team has reached a certain number of overall goals in a currently displayed match before the match is finished.

The media guidance application may then obtain a current competition score of the currently displayed sporting event. Specifically, the media guidance application may progressively sample a frame from the first media asset and perform content recognition on the sampled frame to extract an indicator corresponding to the current competition score. For example, the media guidance application may retrieve a display layout format of the first media asset, e.g., based on the media source of the first media asset. The display layout format may indicate that a score display box is usually positioned at the lower left corner, e.g., shown at 109. In a different example, the media guidance application may search the metadata including at least the closed captioning data for the current competition score. In another example, the media guidance application may retrieve and search data received via a digital network (e.g., communications network 514 in FIG. 5), for a competition score update, e.g., based on a topic name, a participant name, a social media hashtag, and/or the like.

The media guidance application may then determine an estimate of remaining time before a competition outcome of the sporting event is available based on the current competition score and the set of competition rules. In the example tennis match 108 shown at user equipment 106, the media guidance application may obtain the current competition score from the box 109 at the lower left corner of the screen at user equipment 106. Based on the competition rule of a tennis match, the media guidance application may determine that the participant "Federer" is likely to win the tennis match because the participant is close to six winning games in the third set while having already won the first two sets. The media guidance application may then retrieve a pre-defined estimate time (e.g., four minutes, five minutes, etc.) for the completion of a single tennis game as the remaining time for the participant to win the last game in the third set and thus win the currently displayed tennis match. The media guidance application may then determine the first future progression point when the user is likely to switch as the estimated remaining time, e.g., four or five minutes, from the current progression point. In some embodiments, the media guidance application may retrieve a user preference profile including a plurality of interest attributes, e.g., from storage 408 in FIG. 4 or data source 518 via communications network 514 in FIG. 5. The media guidance application may search the plurality of interest attributes based on the name of the participant in the currently played media asset, e.g., "Federer" or "Nadal" in the currently displayed tennis match 108. In response to determining that one of "Federer" or "Nadal" matches with the user's interest profile, the media guidance application may determine that the user is likely to remain on the channel if the participant of interest is prevailing in the currently displayed tennis match. Or the media guidance application may determine that the user is likely to switch away from the channel if the participant of interest is losing in the currently displayed tennis match.

In some embodiments, the media guidance application may predict the time that the user is likely to switch when a large number of other users have switched from the first media asset. Specifically, the media guidance application may transmit, to a remote server, a first query for a first number of users within a geographical area that are viewing the first media asset from the first media source at a first progression point. For example, the media guidance application may obtain from the first query the total number of users watching the same media asset when the media asset begins to transmit. The media guidance application may transmit, to the remote server, a second query for a second number of users within the geographical area that are viewing the first media asset from the first media source at a second progression point. For example, the media guidance application may obtain from the second query the total number of users who remain watching the same media asset after a period of time, e.g., 70%, 80%, and/or the like into the scheduled transmission duration of the media asset. The media guidance application may determine whether the second number is less than the first number for more than a pre-defined percentage threshold. For example, the media guidance application may determine whether more than a threshold (e.g., 45%, 55%, and/or the like) of users who were watching the same media asset have switched away from the media asset by a certain time point, e.g., indicating that users may have declining interests in continuing watching the media asset, or that a result for the media asset is determined by the time point so users start to switch away, and/or the like. In response to determining that the second number is less than the first number for more than the pre-defined percentage threshold, the media guidance application may predict that the user is likely to switch from the currently displayed media asset shortly, and may start to buffer a second media asset from the second media source into the storage device, as further described below.

In addition to predicting the time when the user is likely to switch away from the first media asset, the media guidance application may predict the second media asset that the user is likely to switch to. Specifically, the media guidance application may determine the second media source that the first media source is predicted to be switched to at the determined first future progression point. In some embodiments, the second media source may include any of a television channel, a VOD source, an Internet video channel, a set-top box that includes a personal video recorder storing previously stored media assets, a network video recorder storing previously stored media assets, and/or the like. The second media source may include data source 516 as described in relation to FIG. 5.

In some embodiments, the media guidance application may predict the second media asset to switch to by analyzing user preference and behavioral data. Specifically, the media guidance application may first determine a set of media assets from a plurality of media sources. Each media asset from the set of media asset is available at the time corresponding to the determined first future progression point when the user is likely to switch from the first media asset. For example, the media guidance application may query a program listing schedule (e.g., received from data source 518 in FIG. 5) from linear television channels to determine programs that are available at the time corresponding to the first future progression point. For another example, the media guidance application may obtain a list of available previously stored media assets at a personal video recorder.

In some embodiments, the media guidance application may determine the second media asset that the user is likely to switch to based on user interests. Specifically, for each media asset from the set of media assets, the media guidance application may determine a respective user interest score for a respective media asset available from the respective media source at the time corresponding to the determined first future progression point. The media guidance application may compare metadata corresponding to the respective media asset with a user interest profile. For example, the media guidance application may extract a type (e.g., tennis, live sports, etc.) and keywords (e.g., "U.S. Open," "Federer," "Nadal," "Men's Single," etc.) of the media asset 108 and compare with a user interest profile that includes a list of user interest attributes (e.g., "sports," "tennis," "Federer," "Murray," etc.). The media guidance application may calculate or allocate an interest score to the respective media asset (e.g., 108) based on a number, or a percentage of attribute match with the user interest profile.

In some embodiments, the media guidance application may determine which media asset the user is likely to switch to based on a popularity of the media asset. Specifically, the media guidance application may then determine a respective popularity score for the respective media asset available from the respective media source at the time corresponding to the determined first future progression point. The media guidance application may aggregate user sentiment data corresponding to the respective media asset obtained from a data source. The data source includes, but not limited to a social media platform, a news site, and a remote server storing viewing data from a plurality of users, and/or the like. For example, the media guidance application may query a remote server (e.g., data source 518 via communications network 514 in FIG. 5) for user sentiment data, which includes user comments, user "likes," user ratings, user recording schedules, and/or the like. The media guidance application may then allocate a numeric value as the popularity score based on a percentage of users showing interests in the respective media asset, e.g., positive comments, scheduling to record the respective media asset, etc.

In some embodiments, the media guidance application may determine that a user is likely to switch to a media asset which the user has started watching but has not finished. Specifically, the media guidance application may determine a continuity score for the respective media asset available from the respective media source at the time corresponding to the determined first future progression point based on a user viewing pattern relating to the respective media asset. The media guidance application may then determine that a respective media asset has been played but not completed in playing within a first pre-defined past period of time (e.g., in the past week, etc.) based on user behavioral data. For example, the media guidance application may search for saved flags (e.g., in storage 408 in FIG. 4) identifying a progression point corresponding to an unfinished media asset, e.g., a previously stored media asset 124 stored at the local mass storage system 125, a VOD program, and/or the like. The media guidance application may assign a first (relatively high) continuity score, e.g., the user is likely to resume watching the respective media asset. For another example, the media guidance application may determine a plurality of media assets belonging to the same series (e.g., a few episodes from the same television show, etc.) with the respective media asset have been played during a second pre-defined past period of time (e.g., in the past five days, ten days, etc.) based on user behavioral data. The media guidance application may assign a second continuity score to the respective media asset as the user is likely to keep watching the same series. Within embodiments, the continuity score is pre-defined for different viewing status associated with a particular media asset. In the above examples, the first continuity score can be defined as higher than the second continuity score.

In some embodiments, the media guidance application may compute a priority score for the respective media asset based on a weighted sum of the respective user interest score, the respective popularity score and the respective continuity score. For example, the weight for each different kind of scores may be pre-defined, and may be adjusted based on user feedback, e.g., whether the user interest, media asset popularity, or the continuation in watching should be placed with more emphasis in determining whether the user is likely to switch to a media asset.

The media guidance application may rank the set of media assets based on the respective priority score, and then select the media asset having the highest priority score as the predicted media asset that the user is likely to switch to. In some embodiments, the media guidance application may select more than one media assets as candidates that the user is likely to switch to. For example, the media guidance application may select the first multiple ranked media assets (e.g., three, four, five, etc.) while displaying a media stream at the user equipment. In some implementations, the hardware platform for pre-caching (e.g., the STB 120) may have 16 tuners, and half (or more) of the 16 tuners may be used to pre-cache media streams that the user is likely to switch to.

Having predicted when and where the user is likely to switch from the first media asset, the media guidance application may monitor the viewing progress and start buffering. Specifically, the media guidance application may monitor a current progression point indicative of a viewing status corresponding to the first media asset. The media guidance application may determine whether the current progression point is within a pre-defined range of the determined first future progression point, e.g., two minutes, three minutes, and/or the like. In response to determining that the current progression point is within the pre-defined range of the determined first future progression point, the media guidance application may automatically start to buffer the second media asset from the second media source into a cache unit, without presenting the buffered content unless the user switches to the second media source to watch the second media asset.

In some embodiments, the media guidance application may keep a cache unit 121 in addition to the hard disk 125 within the set-top box 120 for pre-tune caching and may use the cache time to create storage space at the hard disk 125, if the cached media asset is to be recorded at the hard disk 125. Specifically, the media guidance application may determine a type of the second media source. In response to determining that the second media source is a television channel (e.g., HBO 126) that has the second media asset scheduled for transmission at the time corresponding to the first progression point, the media guidance application may cache streaming data from the television channel at the cache unit 121 at the storage device for a period of caching time. The media guidance application may arrange, during the period of caching time, a new storage space at the hard disk 125 at the storage device for storing the streaming data. For example, the media guidance application may create a file name and the storage space for a media file for storing the streaming data corresponding to the second media asset from the television channel 126. The media guidance application may then transfer the cached streaming data from the cache unit 121 to the arranged storage space at the hard disk 125 after the period of caching time.

In some embodiments, the media guidance application may keep a separate cache unit 122 for caching content for a previously stored media asset from the hard disk 125 for faster output to user equipment 106. Specifically, in response to determining that the second media source is a local or network hard disk that has the second media asset previously stored, the media guidance application may determine a recent progression point within the second media asset that has been most recently accessed. For example, the media guidance application may retrieve a progression point (e.g., from storage 408 in FIG. 4) associated with the second media asset (e.g., a previously stored tennis match 124) indicating where the user has left off. The media guidance application may start caching the second media asset from the recent progression point. Specifically, the media guidance application may transfer, from the local or network hard disk 125, a segment of the second media asset starting from the recent progression point, to the cache unit 122 at the storage device (e.g., the set-top box 120).

The caching process may facilitate an improved user experience in channel switching with minimum or reduced latency. Specifically, in response to receiving an indication to switch from the first media source to the second media source (while having been caching the second media source at the cache unit 121 or 122) at the user equipment, the media guidance application may play back a buffered portion of the second media asset from the cache unit 121 or 122, without having to waiting for the tuner of the set-top box 120 to tune to the switched channel (e.g., 126), or waiting to read media data from the hard disk 125. In some embodiments, the media guidance application may monitor whether the user actually switch to the predicted media source at the predicted future point. If the user does not switch to the predicted media source at the predicted future point (e.g., the user may not switch at all, or the user switches to a media source that is different from the predicted media source), the media guidance application may stop buffering the predicted media asset and may vacate the cache unit that has been used to buffer the predicted media asset.

In some embodiments, the media guidance application may be prepared for the user to switch back to the originally displayed channel after a commercial break, e.g., by buffering streaming content from the originally displayed channel while the user has switched to a different media asset during the commercial break. Specifically, after starting to play back the buffered portion of the second media asset from the cache unit 121 or 122, the media guidance application may start to buffer the first media asset from the first media source. For example, when a user is watching the tennis match 108 from the ESPN channel, the media guidance application may predict a commercial break and predict that the user is likely to switch to the HBO channel 126 at the commercial break. The media guidance application may start buffering streaming data from the HBO channel 126 at the cache unit 121 when the time gets close to the predicted commercial break. During the commercial break, the user may request to switch to the HBO channel 126, and the media guidance application may playback buffered streaming data from the cache unit 121. The media guidance application may predict the time when the commercial break at the ESPN channel is likely to end and the user is likely to switch back to the ESPN channel so that the media guidance application may cache the ESPN channel at the cache unit 121 as well. Specifically, the media guidance application may determine whether a second indication is received to switch back to the first media source from the second media source within a duration derived from the commercial break pattern, e.g., the average length of the commercial break, etc. In response to receiving the second indication to switch back to the first media source from the second media source within the duration derived from the commercial break pattern, the media guidance application may play back a buffered portion of the first media asset from the cache. If no second indication is received to switch back to the first media source from the second media source within the duration derived from the commercial break pattern (e.g., the user may decide to continue watching the HBO channel), the media guidance application may stop caching the first media asset (e.g., content from the ESPN channel) and delete the buffered portion of the first media asset from the cache unit 121. In some implementations, the cache unit 121 and/or 122 may take a form as a circular buffer such that the media guidance application may continue buffering media assets that the user is likely to switch to at the cache unit (121 or 122 depending on whether the media asset is from a live stream or previously stored as described above) in a circular manner, e.g., newly cached portion may overwrite older portions when the circular buffer is full.

Figure 5:
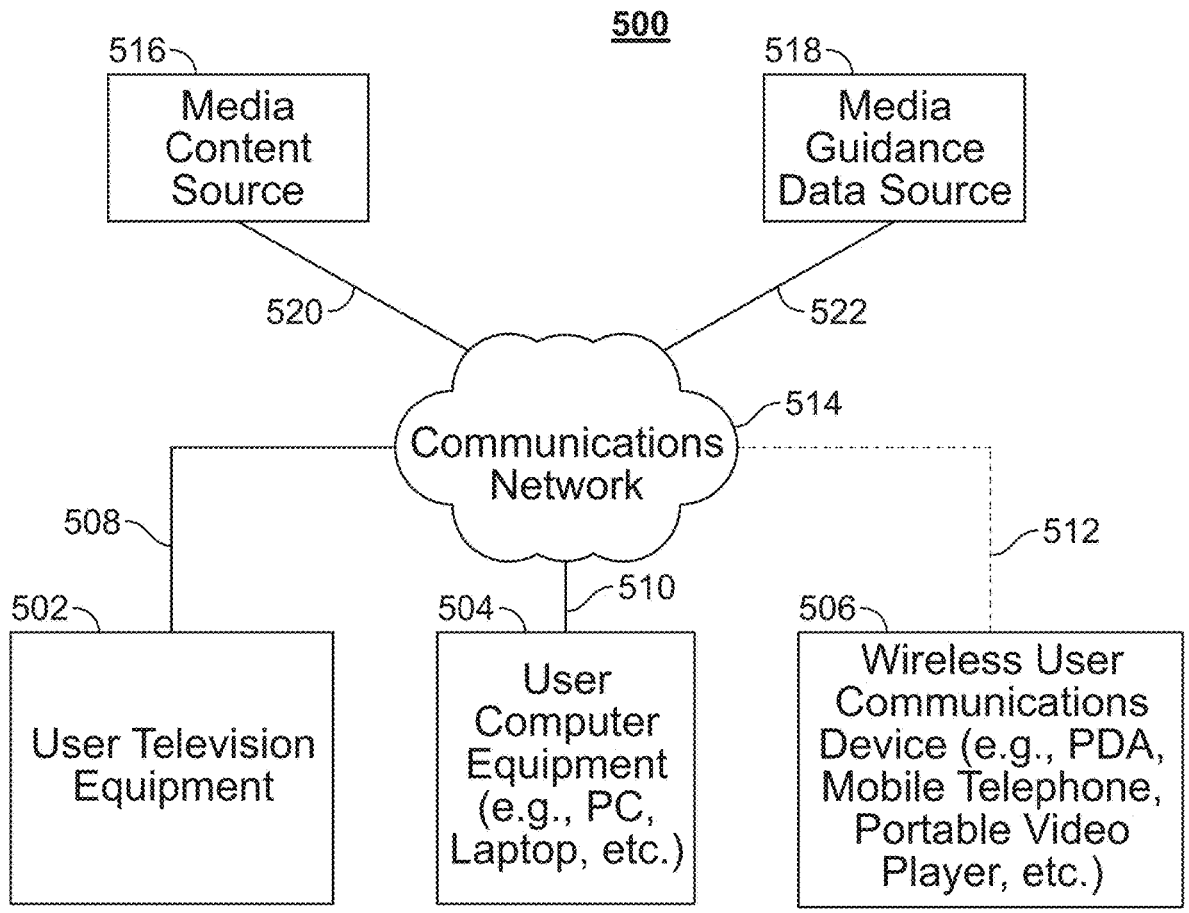
FIG. 5 is a block diagram of an illustrative media system in accordance with some embodiments of the disclosure.

In some implementations, the buffered or cached content of a media asset that the user is likely to switch to may be shared among network devices (e.g., via communications network 514 in FIG. 5). For example, the STB 120 may be used to determine and buffer media assets that the user is likely to switch to at a cache unit (e.g., 121 or 122), and the buffered portion may be sent to one or more user devices on which a user may stream media assets, e.g., a tablet computer, a Smartphone, etc. Thus when a user is watching media assets (e.g., linear streaming) via a user device which may have limited buffer space, the user device may utilize the buffer/cache space on the DVR to pre-cache media assets that the user is likely to switch to. In this way, when the user switches to another media asset on the user device, the user device may start streaming the cached portion of the newly switched media asset from the cache unit of the DVR to achieve faster tuning.

Figure 2:
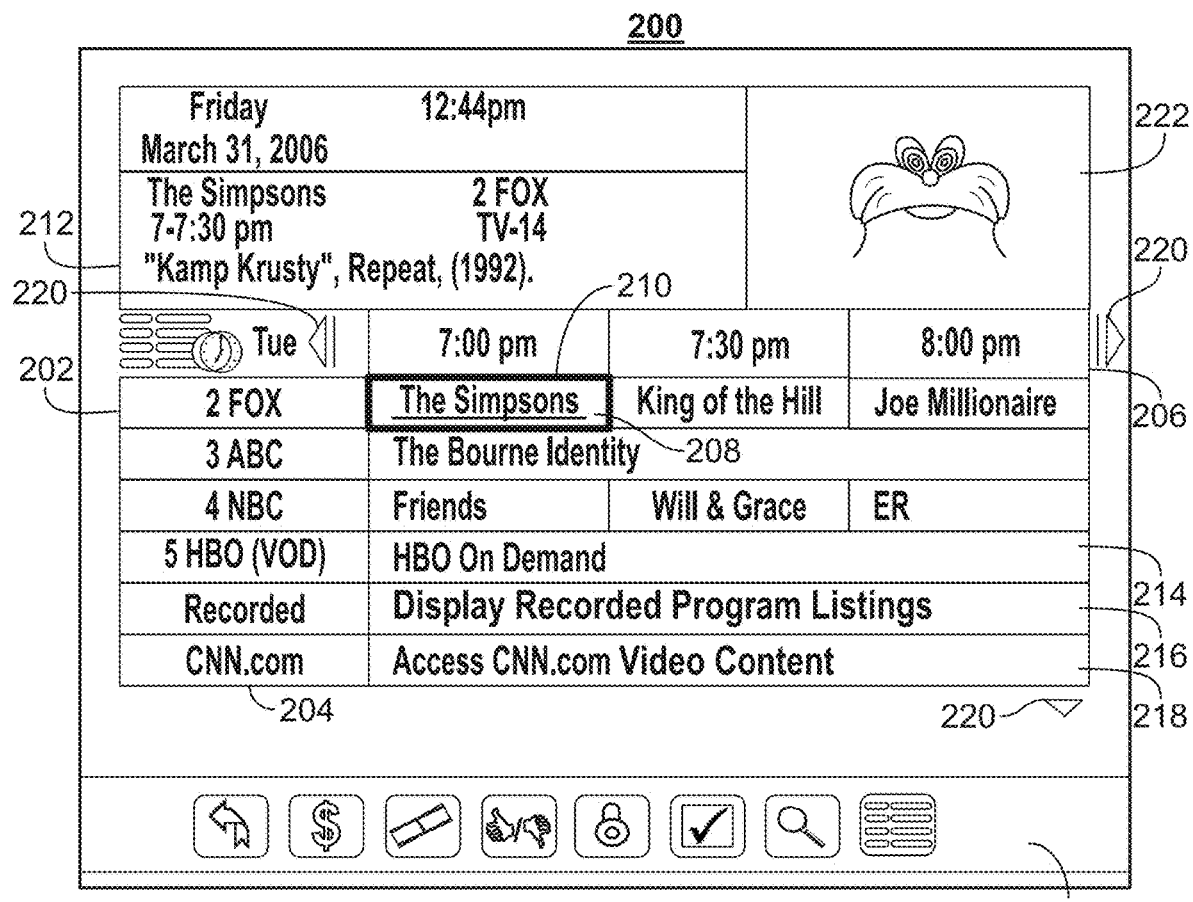
FIG. 2 shows an illustrative embodiment of a display screen that may be used to provide media guidance application listings and other media guidance information, in accordance with some embodiments of the disclosure.
Figure 3:
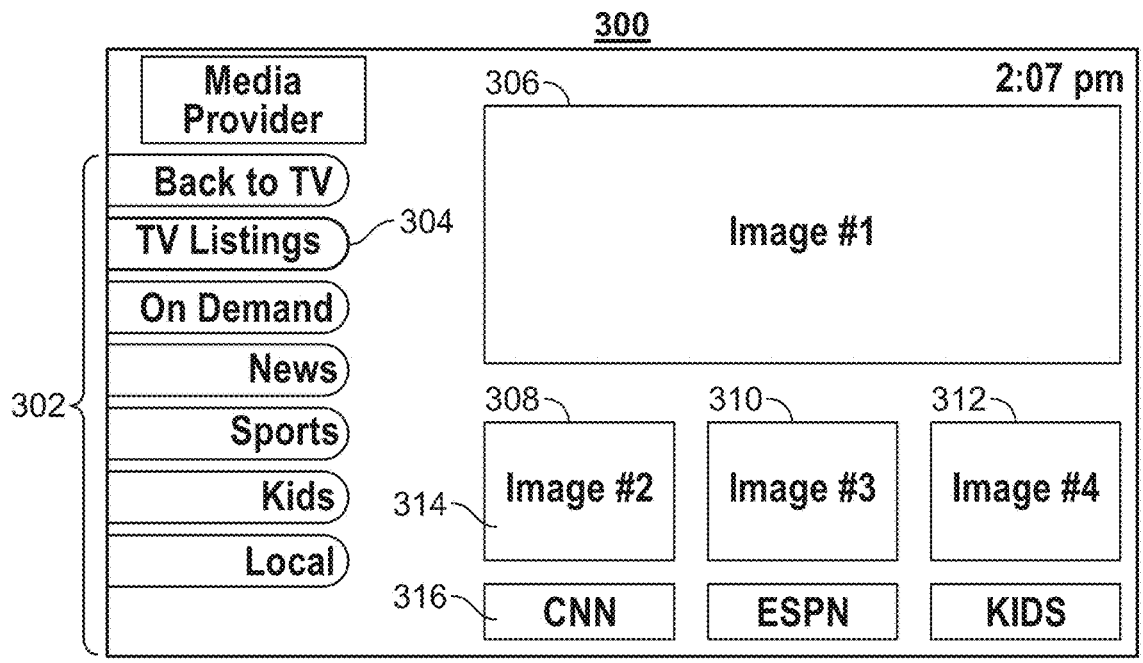
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform, e.g., user equipment 106 or the set-top box 120 in FIG. 1. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 2D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
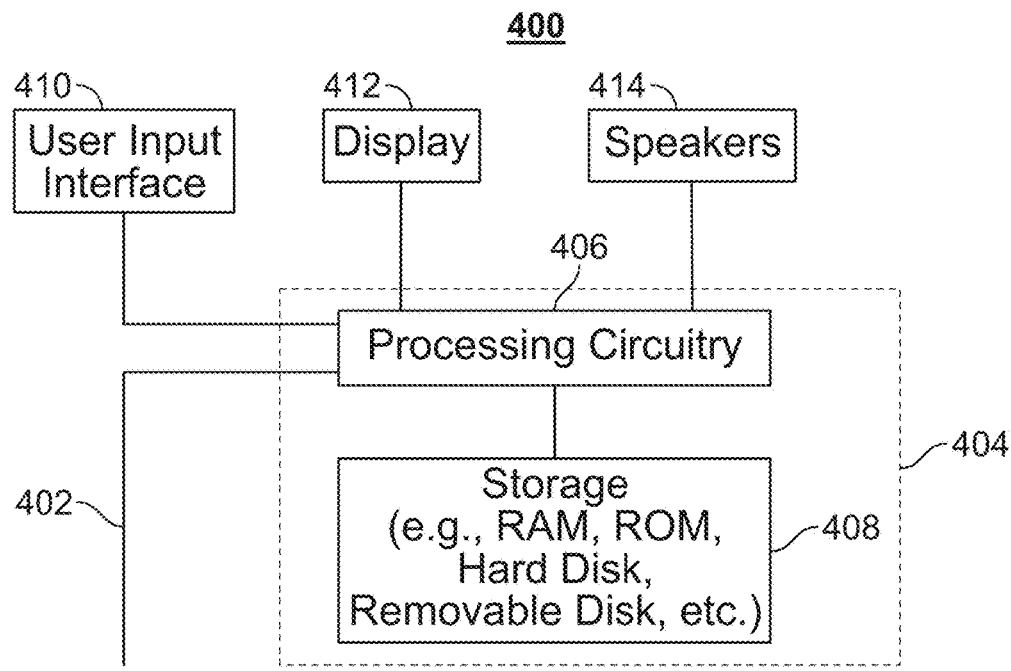
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 504, which includes processing circuitry 406 and storage 408. Control circuitry 604 may be used to send and receive commands, requests, and other suitable data using I/O path 402. I/O path 402 may connect control circuitry 604 (and specifically processing circuitry 406) to one or more communications paths (described below). I/O functions may be provided by one or more of these communications paths, but are shown as a single path in FIG. 4 to avoid overcomplicating the drawing.

Control circuitry 504 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 408). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 504 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 504 may retrieve instructions of the application from storage 408 and process the instructions to generate any of the displays discussed herein. Based on the processed instructions, control circuitry 504 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 504 of a user equipment device 400. In some embodiments, media guidance applications may be client-server applications where only a client application resides on the user equipment device, and server application resides on a remote server. For example, media guidance applications may be implemented partially as a client application on control circuitry 504 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
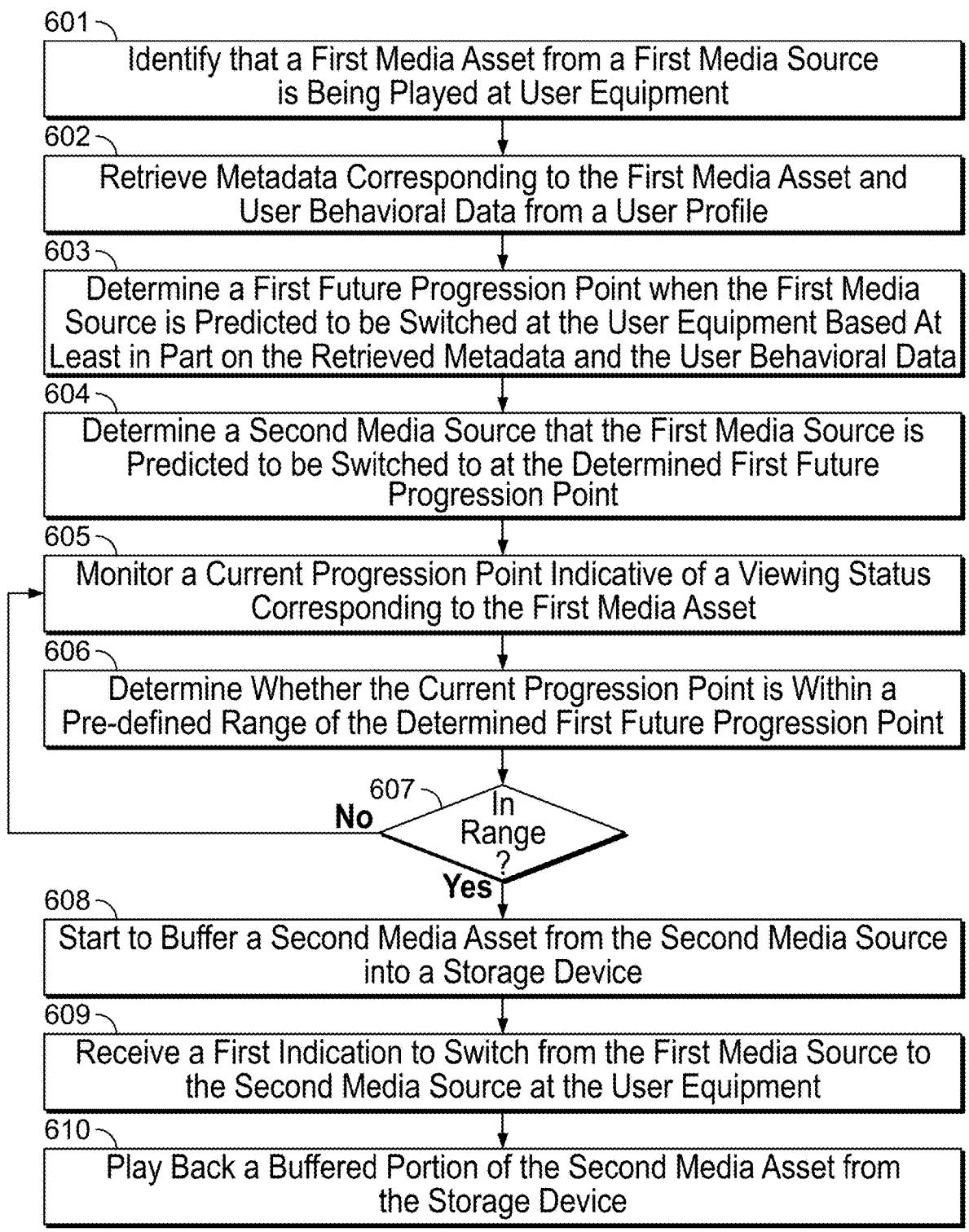
FIG. 6 depicts an illustrative flowchart of a process for adaptively predicting when a user is likely to switch to a new media source and buffering media content from the new media source, in accordance with some embodiments of the disclosure.

FIG. 6 depicts an illustrative flowchart of a process for adaptively predicting when a user is likely to switch to a new media source and buffering media content from the new media source, in accordance with some embodiments of the disclosure. Process 600 may be executed by control circuitry 504 (e.g., in a manner instructed to control circuitry 504 by the media guidance application). Control circuitry 504 may be part of user equipment (e.g., user equipment 106, set-top box 120, user television equipment 502, user computer equipment 504, and/or wireless communications device 506), or of a remote server separated from the user equipment by way of communications network 514.

Process 600 begins at 601, where control circuitry 504 identifies that a first media asset from a first media source is being played at user equipment (e.g., see 106 in FIG. 1). For example, control circuitry 504 obtains media data from a tuner that is configured to receive media data, e.g., from data source 516 via communications network 514 in FIG. 5. At 602, control circuitry 504 retrieves metadata corresponding to the first media asset and user behavioral data from a user profile, e.g., from storage 408 in FIG. 4, or a remote data source 518 in FIG. 5. For example, the metadata corresponding to the first media asset may include but not limited to a media asset identifier, a media asset title, a program description, a channel identifier, and/or the like. In some embodiments, when the first media asset corresponds to a sports match, the metadata may include the names of the participants. For another example, the user behavioral data may include the past viewing pattern such as occurrences indicating whether the user usually switches away from a channel at commercial breaks. At 603, control circuitry 504 determines a first future progression point when the first media source is predicted to be switched at the user equipment based at least in part on the retrieved metadata and the user behavioral data, e.g., as further described in FIGS. 7-8. At 604, control circuitry 504 determines a second media source that the first media source is predicted to be switched to at the determined first future progression point, e.g., as further described in FIG. 9. At 605, control circuitry 504 monitors a current progression point indicative of a viewing status corresponding to the first media asset. For example, control circuitry 504 tracks and reads a pointer stored with the media file corresponding to the first media asset, wherein the pointer links to the current progression point. At 606, control circuitry 504 determines whether the current progression point is within a pre-defined range of the determined first future progression point. For example, control circuitry 504 monitors whether the current play position is within 10 seconds, 15 seconds, etc. to the determined first future progression point when the user is predicted to switch. At 607, if the current progression point is within a pre-defined range of the determined first future progression point, process 600 continues to 608, where control circuitry 504 starts to buffer a second media asset from the second media source into a storage device, e.g., storage 408 in FIG. 4. For example, as further described in FIG. 1, control circuitry 504 buffers the second media asset into cache unit 121 (when the second media asset is a live program from a linear channel) or cache unit 122 (when the second media asset is a previously stored media asset). Or if the current progression point is not within a pre-defined range of the determined first future progression point, process 600 goes back to 605 to keep monitoring the playback progression. At 609, control circuitry 504 receives a first indication, e.g., via I/O path 402 in FIG. 4, to switch from the first media source to the second media source at the user equipment. For example, control circuitry 504 may receive an infrared signal from a remote control and the infrared signal corresponds to a pre-defined infrared entry for switching to a second media source. At 610, control circuitry 504, plays back a buffered portion of the second media asset from the storage device, e.g., at storage 408 in FIG. 4. For example, control circuitry 504 reads buffered content from the cache unit 121 or 122, as described in FIG. 1. In some embodiments, control circuitry 504 may decode and process the buffered content at the cache unit 121 or 122, and output the buffered content in an uncompressed format to user equipment 106 as described in FIG. 1.

Figure 7:
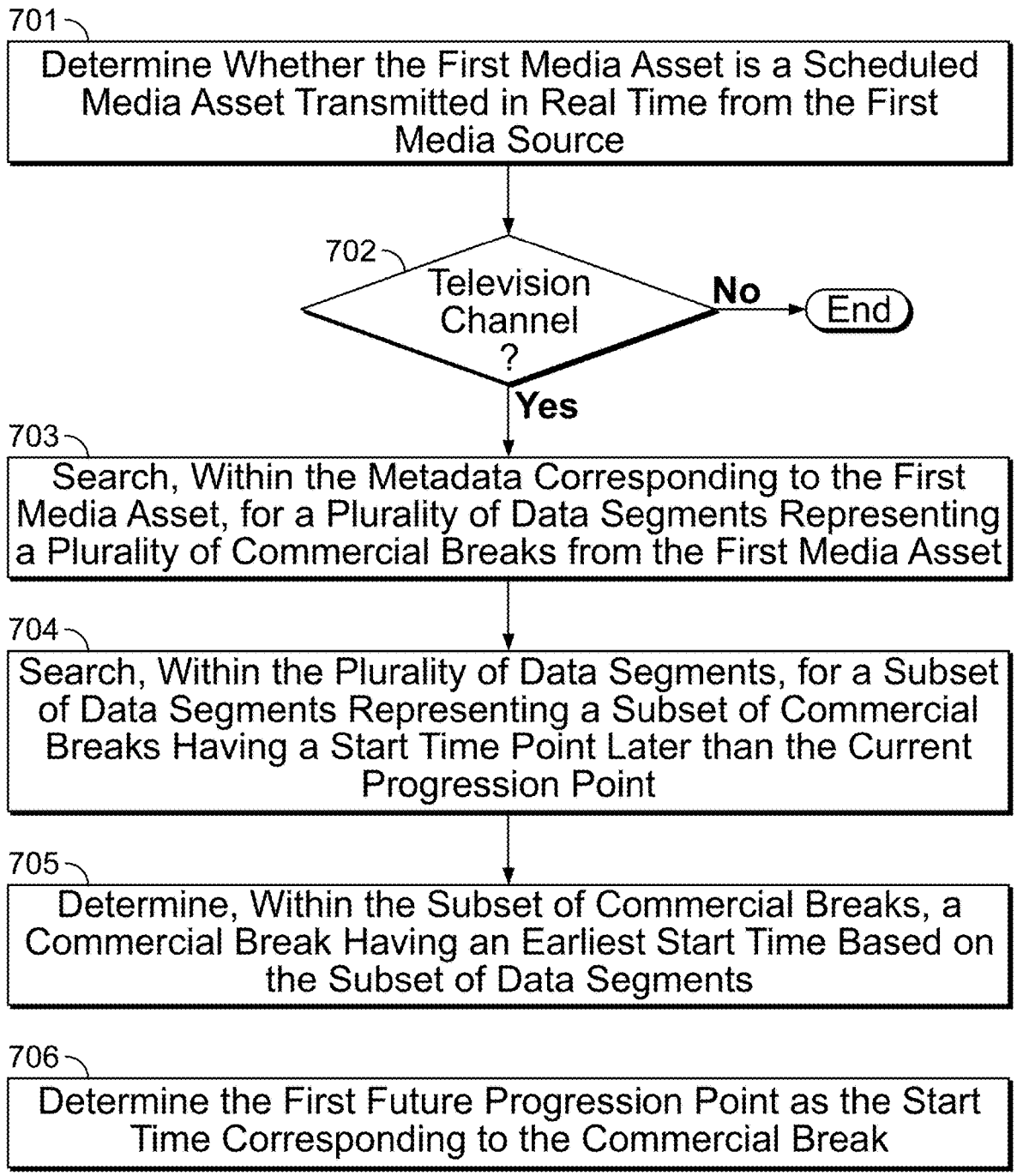
FIG. 7 depicts an illustrative flowchart of a process for predicting when a user is likely to switch to a second media source based on a commercial break from the first media source, in accordance with some embodiments of the disclosure.

FIG. 7 depicts an illustrative flowchart of a process for predicting when a user is likely to switch to a second media source based on a commercial break from the first media source, in accordance with some embodiments of the disclosure. Process 700 may be executed by control circuitry 504 (e.g., in a manner instructed to control circuitry 504 by the media guidance application). Control circuitry 504 may be part of user equipment (e.g., user equipment 106, set-top box 120, user television equipment 502, user computer equipment 504, and/or wireless communications device 506), or of a remote server separated from the user equipment by way of communications network 514.

Process 700 begins at 701, where control circuitry 504 determines whether the first media asset is a scheduled media asset transmitted in real time from the first media source. For example, control circuitry 504 identifies a type of the first media source based on signals from a tuner of user equipment (e.g., 106 or set-top box 120 in FIG. 1) that receives the first media asset. At 702, if the first media source is a television channel (and/or other Internet channel that transmits linear media assets), process 700 goes to 703, where control circuitry 504 searches, within the metadata corresponding to the first media asset, for a plurality of data segments representing a plurality of commercial breaks from the first media asset. For example, control circuitry 504 forms a query based on a field name flagging the start of a commercial break, and in response to the query, retrieves data segments including the start time and the end time of each respective commercial break. At 702, if the first media source is not a television channel (and/or other Internet channel), e.g., a previously stored media asset from DVR, process 700 ends.

At 704, control circuitry 504 searches, within the plurality of data segments, for a subset of data segments representing a subset of commercial breaks having a start time point later than the current progression point. For example, control circuitry 504 sets a time constraint corresponding to the current progression point, and searches for data tags corresponding to commercial breaks that will occur after the current progression point. At 705, control circuitry 504 determines, within the subset of commercial breaks, a commercial break having the earliest start time based on the subset of data segments. For example, control circuitry 504 sorts data segments corresponding to the subset of commercial breaks based on their respective start times, and then retrieves the data segment corresponding to the earliest start time. At 706, control circuitry 504 determines the first future progression point as the start time corresponding to the commercial break. For example, control circuitry 504 stores the earliest start time corresponding to the commercial break as the predicted future progression point when the user is likely to switch, at storage 408 in FIG. 4.

Figure 8:
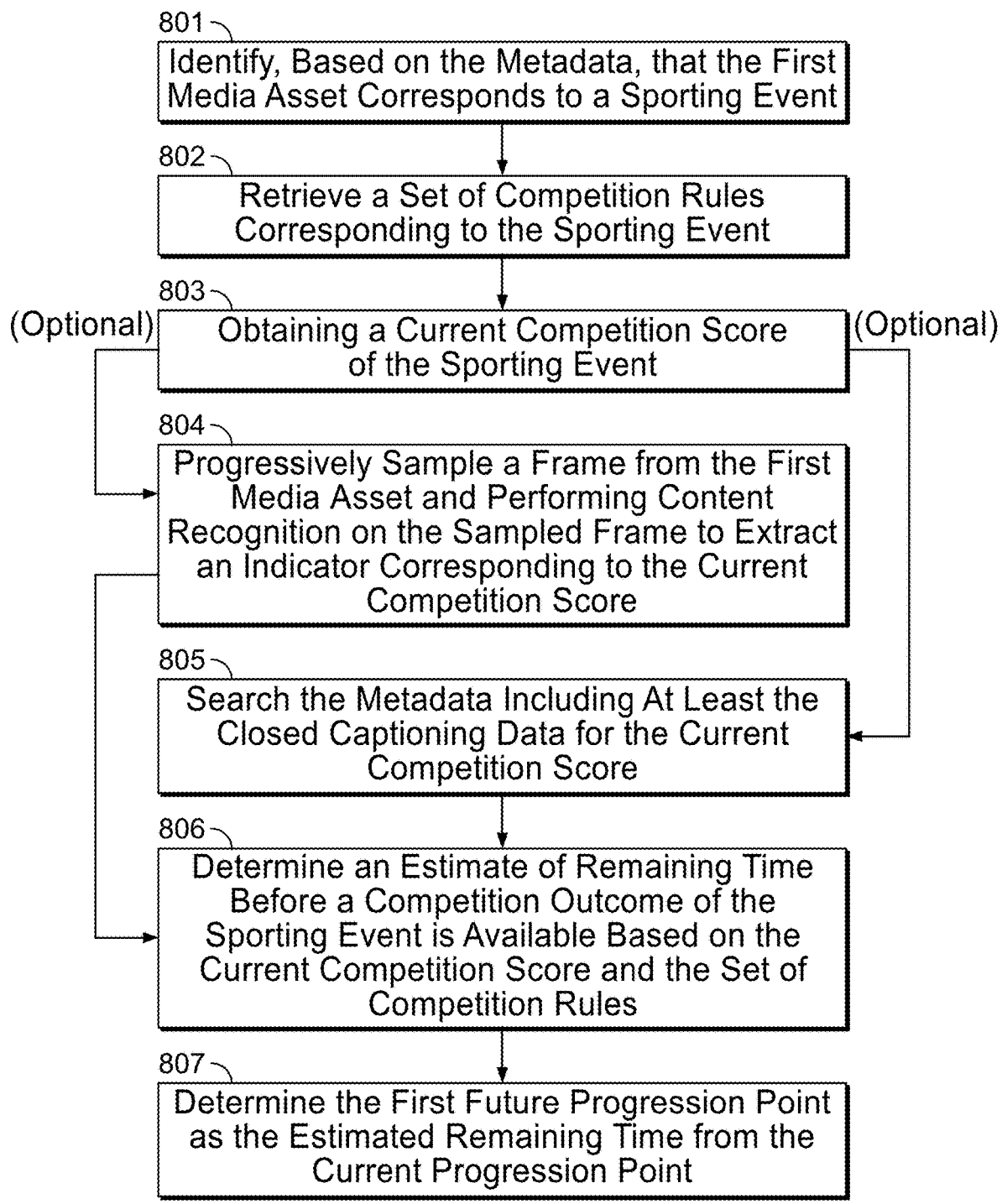
FIG. 8 depicts an illustrative flowchart of a process for predicting when a user is likely to switch away from a sporting event based on a competition result of a sporting event, in accordance with some embodiments of the disclosure.

FIG. 8 depicts an illustrative flowchart of a process for predicting when a user is likely to switch away from a sporting event based on a competition result of a sporting event, in accordance with some embodiments of the disclosure. Process 800 may be executed by control circuitry 504 (e.g., in a manner instructed to control circuitry 504 by the media guidance application). Control circuitry 504 may be part of user equipment (e.g., user equipment 106, set-top box 120, user television equipment 502, user computer equipment 504, and/or wireless communications device 506), or of a remote server separated from the user equipment by way of communications network 514.

Process 800 begins at 801, where control circuitry 504 identifies, based on the metadata, that the first media asset corresponds to a sporting event. For example, control circuitry 504 retrieves data fields such as a title of the media asset, a description of the media asset, and/or the like. At 802, control circuitry 504 retrieves a set of competition rules corresponding to the sporting event, e.g., from storage 408 in FIG. 4, or data source 518 via communications network 514 in FIG. 5. For example as described in relation to FIG. 1, the set of competition rules includes logic rules to determine which participant of the sporting event is prevailing based on a competition score of the currently displayed sporting event. In some examples, the competition rules may apply to the competition scenarios of a single sporting match, e.g., which participant wins the sporting match. In some examples, the competition rules may include logics that apply to a series of sporting events to determine the competition status relating to a participant in the currently displayed sporting event. At 803, control circuitry 504 obtains a current competition score of the sporting event. For example, at 804, control circuitry 504 progressively samples a frame from the first media asset and performs content recognition on the sampled frame to extract an indicator (e.g., the box 109 in FIG. 1) corresponding to the current competition score. For another example, at 805, control circuitry 504 searches the metadata including at least the closed captioning data for the current competition score. At 806, control circuitry 504 determines an estimate of remaining time before a competition outcome of the sporting event is available based on the current competition score and the set of competition rules. For example, control circuitry 504 retrieves a pre-defined table from storage 408 in FIG. 4 or data source 518 in FIG. 5, and the pre-defined table includes a list of types of sporting activities and a respective estimate of time to complete the respective sporting activity. For instance, when the first media asset corresponds to a tennis match, control circuitry 504 retrieves an entry from the pre-defined table, prescribing that a set in a tennis game usually lasts four to five minutes. At 807, control circuitry 504 determines the first future progression point as the estimated remaining time from the current progression point. For example, control circuitry 504 adds the estimated remaining time to the current progression point, such as the duration of a set in a tennis game when the score indicates that the tennis match is one set away from having a definitive competition result.

Figure 9:
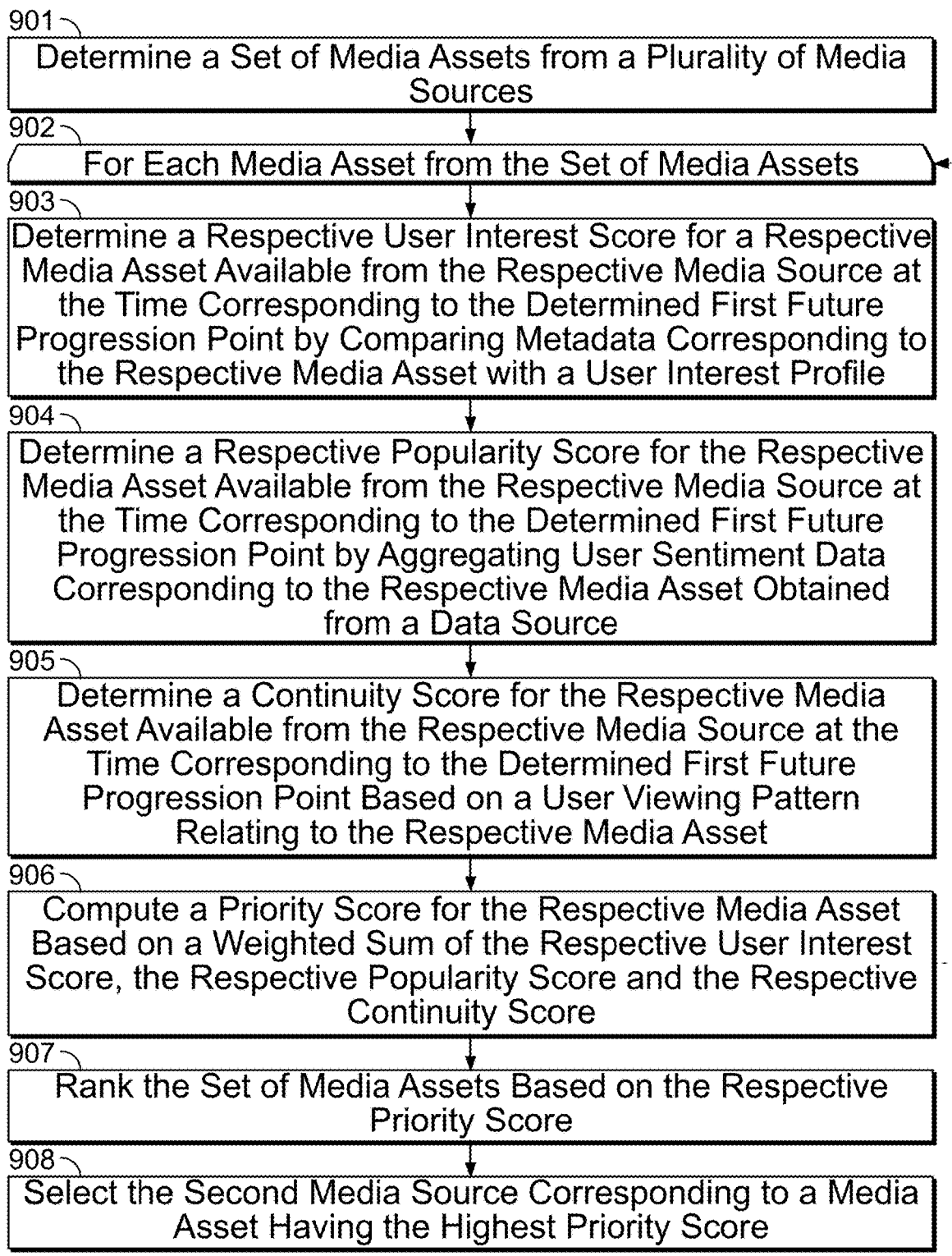
FIG. 9 depicts an illustrative flowchart of a process for determining a new media source that the user is likely to switch to, in accordance with some embodiments of the disclosure.

FIG. 9 depicts an illustrative flowchart of a process for determining a new media source that the user is likely to switch to, in accordance with some embodiments of the disclosure. Process 900 may be executed by control circuitry 504 (e.g., in a manner instructed to control circuitry 504 by the media guidance application). Control circuitry 504 may be part of user equipment (e.g., user equipment 106, set-top box 120, user television equipment 502, user computer equipment 504, and/or wireless communications device 506), or of a remote server separated from the user equipment by way of communications network 514.

Process 900 begins at 901, where control circuitry 504 determines a set of media assets from a plurality of media sources, e.g., data source 516 via communications network 514 in FIG. 5. At 902, for each media asset from the set of media assets, control circuitry 504 determines a respective user interest score for a respective media asset available from the respective media source at the time corresponding to the determined first future progression point at 903. For example, control circuitry 504 retrieves a user interest profile including a set of preference attributes from storage 408 in FIG. 4 or data source 518 in FIG. 5. The control circuitry 504 compares metadata corresponding to the respective media asset with the set of preference attributes to determine an overlap percentage as the user interest score. At 904, control circuitry 504 determines a respective popularity score for the respective media asset available from the respective media source at the time corresponding to the determined first future progression point. For example, control circuitry 504 retrieves and aggregates user sentiment data corresponding to the respective media asset obtained from a data source, e.g., from data source 518 in FIG. 5. For instance, the user sentiment data includes user comments, user "likes," user scheduled recordings, and/or the like from a user group within the same geographical area with the respective user. At 905, control circuitry 504 determines a continuity score for the respective media asset available from the respective media source at the time corresponding to the determined first future progression point based on a user viewing pattern relating to the respective media asset. For example, control circuitry 504 determines a status of the respective media asset, e.g., whether the user has started watching but has not finished watching the media asset, and allocates a continuity score to the media asset. At 906, control circuitry 504 computes a priority score for the respective media asset based on a weighted sum of the respective user interest score, the respective popularity score and the respective continuity score. For example, control circuitry 504 retrieves pre-defined weights for the respective user interest score, the respective popularity score and the respective continuity score from storage 408 in FIG. 4, or data source 518 in FIG. 5. In some embodiments, control circuitry 504 adjusts the pre-defined weights to place a relatively higher emphasis on a type of the scores. Process 600 continues to 902 to repeat 903-906 for each media asset from the set of media assets. At 907, control circuitry 504 ranks the set of media assets based on the respective priority score, e.g., at storage 408 in FIG. 4. At 908, control circuitry 504 selects the second media source corresponding to a media asset having the highest priority score, or a few media assets having the highest priority scores. In some embodiments, control circuitry 504 selects more than one media assets with the highest priority scores as candidates to be buffered. For example, control circuitry 504 buffers a linear program from a television channel at cache unit 121 as described in FIG. 1, and simultaneously buffers a previously stored media asset at cache unit 122 as described in FIG. 1

Figure 10:
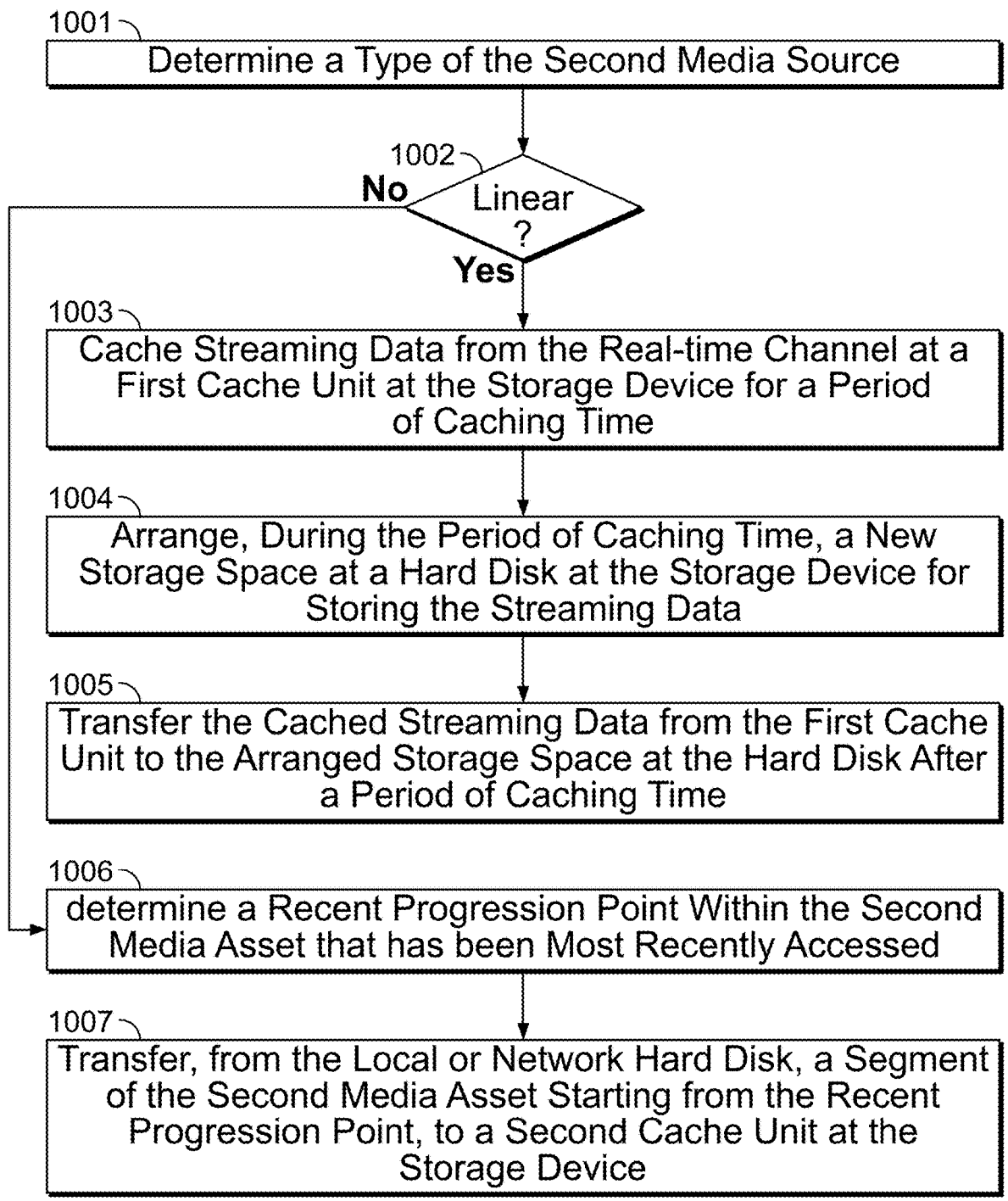
FIG. 10 depicts an illustrative flowchart of a process for buffering different types of media assets at different cache units, in accordance with some embodiments of the disclosure.

FIG. 10 depicts an illustrative flowchart of a process for buffering different types of media assets at different cache units, in accordance with some embodiments of the disclosure. Process 1000 may be executed by control circuitry 504 (e.g., in a manner instructed to control circuitry 504 by the media guidance application). Control circuitry 504 may be part of user equipment (e.g., user equipment 106, set-top box 120, user television equipment 502, user computer equipment 504, and/or wireless communications device 506), or of a remote server separated from the user equipment by way of communications network 514.

Process 1000 begins at 1001, where control circuitry 504 determines a type of the second media source. For example, control circuitry 504 retrieves a field in the signal received via a tuner at the set-top box (e.g., see STB 120 in FIG. 1), and determines whether the second media source is a linear source such as a television channel or Internet channel that transmits the second media asset in real time. At 1002, if the second media source is a linear source, process 1000 proceeds to 1003, where control circuitry 504 caches streaming data from the linear channel at a first cache unit (e.g., see cache unit 121 in FIG. 1) at the storage device for a period of caching time. For example, control circuitry 504 temporarily writes video content from the linear channel to the cache unit, and vacates the cache unit if the user does not switch to the second media source at the predicted future progression point, as described in FIG. 1. At 1004, control circuitry 504 arranges, during the period of caching time, a new storage space at a hard disk at the storage device for storing the streaming data. For example, control circuitry 504 determines an estimate of the storage space needed, and locates the memory address in the hard disk for the storage space. Control circuitry 504 then creates a temporary file name to store the cached content as a media file if needed. At 1005, control circuitry 504, in response to a recording request of the second media asset (e.g., when the user has switched to the second media source and requested recording the second media asset), control circuitry 504 transfers the cached streaming data from the first cache unit to the arranged storage space at the hard disk after a period of caching time. For example, control circuitry 504 copies the buffered content from the cache unit to the hard disk at the memory address, and saves the buffered content under the prepared media file name. Control circuitry 504 then continues saving media content from the second media source to the hard disk under the media file name.

At 1002, when the second media source is not a linear source (e.g., the second media source is a VOD source, a network or local DVR that stores previously stored media assets, etc.), control circuitry 504 determines a recent progression point within the second media asset that has been most recently accessed. For example, control circuitry 504 retrieves information relating to the second media asset, and reads, from metadata, a flag of playback position where the user left off. At 1008, control circuitry 504 transfer, from the local or network hard disk where the second media asset has been stored, a segment of the second media asset starting from the recent progression point, to a second cache unit at the storage device. For example, control circuitry 504 maintains a separate cache unit (e.g., see cache 122 in FIG. 1) for previously stored media assets to cache content of the second media asset from the playback position where the user left off before the user switches to playback the second media asset.

It should be noted that processes 600-1000 or any step thereof could be performed on, or provided by, any of the devices shown in, or described with respect to, FIGS. 1 and 4-5. For example, any of processes 600-1000 may be executed by control circuitry 504 (FIG. 5) as instructed by control circuitry implemented on user equipment 106 (FIG. 1), 502, 504, 506 (FIG. 5), and/or the like for generating and displaying a summary view of a media asset. In addition, one or more steps of processes 600-1000 may be incorporated into or combined with one or more steps of any other process or embodiment.

It is contemplated that the actions or descriptions of each of FIGS. 6-10 may be used with any other embodiment of this disclosure. In addition, the actions and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-10 could be used to perform one or more of the actions in FIGS. 6-10.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, calculating a priority score corresponding to a media asset to determine whether a user is likely to switch to the respective media asset, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, the attributes of media assets, may be stored in, and retrieved from, storage 408 of FIG. 4, or media guidance data source 518 of FIG. 5. Furthermore, processing circuitry, or a computer program, may update configuration data of the media guidance application, which may be stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for adaptively buffering content of a media asset from a media source when a different media asset from a different media source is being played at user equipment, the method comprising:

determining that a first media asset from a first media source is being played at user equipment;

predicting a first future progression point when the first media source is likely to be switched at the user equipment based on metadata corresponding to the first media asset, wherein predicting the first future progression point when the first media source is likely to be switched at the user equipment based on the metadata corresponding to the first media asset comprises:

transmitting, to a remote server, a first query for a first number of users within a geographical area that are viewing the first media asset from the first media source at a first progression point;

transmitting, to the remote server, a second query for a second number of users within the geographical area that are viewing the first media asset from the first media source at a second progression point;

determining whether the second number is less than the first number for more than a pre-defined ratio threshold; and in response to determining that the second number is less than the first number for more than the pre-defined ratio threshold, initiating starting to buffer the second media asset from the second media source into the storage device;

predicting a second media source that the first media source is likely to be switched to at the predicted first future progression point;

monitoring a current progression point indicative of a viewing status corresponding to the first media asset;

in response to determining that the current progression point is within a pre-defined range of the predicted first future progression point, automatically starting to buffer a second media asset from the second media source into a storage device; and in response to receiving a first indication to switch from the first media source to the second media source at the user equipment, playing a buffered portion of the second media asset from the storage device.

2. The method of claim 1, further comprising predicting a second future progression point when the first media source is likely to be switched at the user equipment based on the metadata corresponding to the first media by:

determining whether the first media asset is a scheduled media asset transmitted in real time from the first media source;

in response to determining that the first media asset is a scheduled media asset transmitted in real time from the first media source:

searching, within the metadata corresponding to the first media asset, for a plurality of data segments representing a plurality of commercial breaks from the first media asset;

searching, within the plurality of data segments, for a subset of data segments representing a subset of commercial breaks having a start time point later than the current progression point;

determining, within the subset of commercial breaks, a commercial break having an earliest start time based on the subset of data segments; and determining the second future progression point as the start time corresponding to the commercial break.

3. The method of claim 2, further comprising:

periodically generating a set of frames from the first media asset for a duration when the first media asset is played;

for each frame from the set of frames, performing content recognition to determine whether the respective frame corresponds to a commercial break;

aggregating a commercial break pattern for the duration when the first media asset is played; and predicting a next progression point later than the current progression point, at which a next commercial break will occur based on the commercial break pattern.

4. The method of claim 3, further comprising:

after starting to play back a buffered portion of the second media asset from the storage device:

starting to buffer the first media asset from the first media source;

determining whether a second indication is received to switch back to the first media source from the second media source within a duration derived from the commercial break pattern;

in response to receiving a second indication to switch back to the first media source from the second media source within the duration derived from the commercial break pattern, playing a buffered portion of the first media asset; and in response to determining that no second indication is received to switch back to the first media source from the second media source within the duration derived from the commercial break pattern, deleting the buffered portion of the first media asset from the storage device.

5. The method of claim 1, further comprising predicting a second future progression point when the first media source is likely to be switched at the user equipment based on the metadata corresponding to the first media asset by:

identifying, based on the metadata, that the first media asset corresponds to a sporting event;

retrieving a set of competition rules corresponding to the sporting event; and obtaining a current competition status of the sporting event by at least one of (a) progressively sampling a frame from the first media asset and performing content recognition on the sampled frame to extract an indicator corresponding to the current competition status, and (b) searching the metadata including at least closed captioning data for the current competition status;

determining an estimate of remaining time before a competition outcome of the sporting event is available based on the current competition status and the set of competition rules; and predicting the second future progression point as the estimated remaining time from the current progression point.

6. The method of claim 1, wherein the predicting the second media source that the first media source is likely to be switched to at the predicted first future progression point comprises:

determining a set of media assets from a plurality of media sources, wherein each media asset from the set of media asset is available at a time corresponding to the predicted first future progression point, wherein each media source from the plurality of media sources is selected from a group consisting of a real-time channel, an on-demand data source, a personal video recorder, a remote storage server, and an Internet video source;

for each media asset from the set of media assets:

determining a respective user interest score for a respective media asset available from the respective media source at the time corresponding to the predicted first future progression point by comparing metadata corresponding to the respective media asset with a user interest profile;

determining a respective popularity score for the respective media asset available from the respective media source at the time corresponding to the predicted first future progression point by aggregating user sentiment data corresponding to the respective media asset obtained from a data source, wherein the data source is selected from a group consisting of a social media platform, a news site, and a remote server storing viewing data from a plurality of users;

determining a continuity score for the respective media asset available from the respective media source at the time corresponding to the predicted first future progression point based on a user viewing pattern relating to the respective media asset;

computing a priority score for the respective media asset based on a weighted sum of the respective user interest score, the respective popularity score and the respective continuity score;

ranking the set of media assets based on the respective priority score; and selecting the second media source corresponding to a media asset having the highest priority score.

7. The method of claim 6, wherein the determining the continuity score for the respective media asset available from the respective media source at the time corresponding to the predicted first future progression point based on the user viewing pattern relating to the respective media asset comprises:

in response to determining that the respective media asset has been played but not completed in playing within a first pre-defined past period of time based on user behavioral data, assigning a first continuity score to the respective media asset; and in response to determining that a plurality of media assets belonging to a same series with the respective media asset have been played during a second pre-defined past period of time based on user behavioral data, assigning a second continuity score to the respective media asset, wherein the first continuity score is higher than the second continuity score.

8. The method of claim 1, wherein the automatically starting to buffer the second media asset from the second media source into the storage device comprises:
   determining a type of the second media source;
   in response to determining that the second media source is a television channel that has the second media asset scheduled for transmission at a time corresponding to the first progression point:
   caching streaming data from the real-time channel at a first cache unit at the storage device for a period of caching time,
   arranging, during the period of caching time, a new storage space at a hard disk at the storage device for storing the streaming data; and
   transferring the cached streaming data from the first cache unit to the arranged storage space at the hard disk after a period of caching time.

9. The method of claim 8, further comprising:
   in response to determining that the second media source is a local or network hard disk that has the second media asset previously stored:
   determining a recent progression point within the second media asset that has been most recently accessed; and
   transferring, from the local or network hard disk, a segment of the second media asset starting from the recent progression point, to a second cache unit at the storage device.

10. A system for adaptively buffering content of a media asset from a media source when a different media asset from a different media source is being played at user equipment, the system comprising:
    a storage device; and
    processing circuitry configured to:
    determine that a first media asset from a first media source is being played at user equipment;
    predict a first future progression point when the first media source is likely to be switched at the user equipment based on metadata corresponding to the first media asset, wherein the processing circuitry is, when predicting the first future progression point when the first media source is likely to be switched at the user equipment based on the metadata corresponding to the first media asset, further configured to:
      transmit, to a remote server, a first query for a first number of users within a geographical area that are viewing the first media asset from the first media source at a first progression point;
      transmit, to the remote server, a second query for a second number of users within the geographical area that are viewing the first media asset from the first media source at a second progression point;
      determine whether the second number is less than the first number for more than a pre-defined ratio threshold; and
      in response to determining that the second number is less than the first number for more than the pre-defined ratio threshold, initiate starting to buffer the second media asset from the second media source into the storage device;
    predict a second media source that the first media source is likely to be switched to at the predicted first future progression point;
    monitor a current progression point indicative of a viewing status corresponding to the first media asset;
    in response to determining that the current progression point is within a pre-defined range of the predicted first future progression point, automatically start to buffer a second media asset from the second media source into the storage device; and
    in response to receiving a first indication to switch from the first media source to the second media source at the user equipment, play a buffered portion of the second media asset from the storage device.

11. The system of claim 10, wherein the processing circuitry is further configured to predict a second future progression point when the first media source is likely to be switched at the user equipment based on the metadata corresponding to the first media asset, wherein, when predicting the second future progression point, the processing circuitry is further configured to:
    determine whether the first media asset is a scheduled media asset transmitted in real time from the first media source;
    in response to determining that the first media asset is a scheduled media asset transmitted in real time from the first media source:
      search, within the metadata corresponding to the first media asset, for a plurality of data segments representing a plurality of commercial breaks from the first media asset;
      search, within the plurality of data segments, for a subset of data segments representing a subset of commercial breaks having a start time point later than the current progression point;
      determine, within the subset of commercial breaks, a commercial break having an earliest start time based on the subset of data segments; and
      determine the second future progression point as the start time corresponding to the commercial break.

12. The system of claim 11, wherein the processing circuitry is further configured to:
    periodically generate a set of frames from the first media asset for a duration when the first media asset is played;
    for each frame from the set of frames, perform content recognition to determine whether the respective frame corresponds to a commercial break;
    aggregate a commercial break pattern for the duration when the first media asset is played; and
    predict a next progression point later than the current progression point, at which a next commercial break will occur based on the commercial break pattern.

13. The system of claim 12, wherein the processing circuitry is further configured to:
    after starting to play back a buffered portion of the second media asset from the storage device:
    start to buffer the first media asset from the first media source;
    determine whether a second indication is received to switch back to the first media source from the second media source within a duration derived from the commercial break pattern;
    in response to receiving a second indication to switch back to the first media source from the second media source within the duration derived from the commercial break pattern, play a buffered portion of the first media asset; and
    in response to determining that no second indication is received to switch back to the first media source from the second media source within the duration derived from the commercial break pattern, delete the buffered portion of the first media asset from the storage device.

14. The system of claim 10, wherein the processing circuitry is further configured to predict a second future progression point when the first media source is likely to be switched at the user equipment based on the metadata corresponding to the first media asset, wherein, when predicting the second future progression point, the processing circuitry is further configured to:
- identify, based on the metadata, that the first media asset corresponds to a sporting event;
- retrieve a set of competition rules corresponding to the sporting event; and
- obtain a current competition status of the sporting event by at least one of (a) progressively sampling a frame from the first media asset and performing content recognition on the sampled frame to extract an indicator corresponding to the current competition status, and (b) searching the metadata including at least closed captioning data for the current competition status;
- determine an estimate of remaining time before a competition outcome of the sporting event is available based on the current competition status and the set of competition rules; and
- predict the second future progression point as the estimated remaining time from the current progression point.

15. The system of claim 10, wherein the processing circuitry is, when predicting the second media source that the first media source is likely to be switched to at the predicted first future progression point, further configured to:
- determine a set of media assets from a plurality of media sources,
  - wherein each media asset from the set of media asset is available at a time corresponding to the predicted first future progression point,
  - wherein each media source from the plurality of media sources is selected from a group consisting of a real-time channel, an on-demand data source, a personal video recorder, a remote storage server, and an Internet video source;
- for each media asset from the set of media assets:
  - determine a respective user interest score for a respective media asset available from the respective media source at the time corresponding to the predicted first future progression point by comparing metadata corresponding to the respective media asset with a user interest profile;
  - determine a respective popularity score for the respective media asset available from the respective media source at the time corresponding to the predicted first future progression point by aggregating user sentiment data corresponding to the respective media asset obtained from a data source,
    - wherein the data source is selected from a group consisting of a social media platform, a news site, and a remote server storing viewing data from a plurality of users;
  - determine a continuity score for the respective media asset available from the respective media source at the time corresponding to the predicted first future progression point based on a user viewing pattern relating to the respective media asset;
  - compute a priority score for the respective media asset based on a weighted sum of the respective user interest score, the respective popularity score and the respective continuity score;
- rank the set of media assets based on the respective priority score; and
- select the second media source corresponding to a media asset having the highest priority score.

16. The system of claim 15, wherein the processing circuitry is, when determining the continuity score for the respective media asset available from the respective media source at the time corresponding to the predicted first future progression point based on the user viewing pattern relating to the respective media asset, further configured to:
- in response to determining that the respective media asset has been played but not completed in playing within a first pre-defined past period of time based on user behavioral data, assign a first continuity score to the respective media asset; and
- in response to determining that a plurality of media assets belonging to a same series with the respective media asset have been played during a second pre-defined past period of time based on user behavioral data, assign a second continuity score to the respective media asset,
  - wherein the first continuity score is higher than the second continuity score.

17. The system of claim 10, wherein the processing circuitry is, when automatically starting to buffer the second media asset from the second media source into the storage device, further configured to:
- determine a type of the second media source;
- in response to determining that the second media source is a television channel that has the second media asset scheduled for transmission at a time corresponding to the first progression point:
- cache streaming data from the real-time channel at a first cache unit at the storage device for a period of caching time,
- arrange, during the period of caching time, a new storage space at a hard disk at the storage device for storing the streaming data; and
- transfer the cached streaming data from the first cache unit to the arranged storage space at the hard disk after a period of caching time.

18. The system of claim 17, wherein the processing circuitry is further configured to:
- in response to determining that the second media source is a local or network hard disk that has the second media asset previously stored:
- determine a recent progression point within the second media asset that has been most recently accessed; and
- transfer, from the local or network hard disk, a segment of the second media asset starting from the recent progression point, to a second cache unit at the storage device.

* * * * *